United States Patent [19]

Huff

[11] Patent Number: 4,957,397
[45] Date of Patent: Sep. 18, 1990

[54] CUTTING TOOL

[76] Inventor: Mark J. Huff, P.O. Box 241, 119 E. James St., Wales, Wis. 53183

[21] Appl. No.: 404,836

[22] Filed: Sep. 8, 1989

[51] Int. Cl.$^5$ .............................................. B23B 51/00
[52] U.S. Cl. .................. 408/224; 76/108.6; 408/230
[58] Field of Search ............... 408/1 R, 199, 223, 224, 408/227, 230; 76/108 T, 108.6

[56] References Cited

U.S. PATENT DOCUMENTS

| | | | |
|---|---|---|---|
| 1,630,602 | 5/1927 | Blanco | 408/224 |
| 2,342,143 | 2/1944 | Howe | 408/224 |
| 2,918,955 | 12/1959 | Simas | 408/230 |
| 3,824,027 | 7/1974 | Janci | 408/230 |
| 3,947,143 | 3/1976 | Gulla | 408/230 |
| 4,257,154 | 3/1981 | Fuller | 408/224 |
| 4,507,028 | 3/1985 | Matsushita | 408/230 |

FOREIGN PATENT DOCUMENTS

| | | | |
|---|---|---|---|
| 94211 | 5/1985 | Japan | 408/230 |
| 283809 | 11/1988 | Japan | 408/230 |

*Primary Examiner*—Daniel W. Howell
*Attorney, Agent, or Firm*—Andrus, Sceales, Starke & Sawall

[57] ABSTRACT

A cutting tool for forming an opening in an object, such a steel belted tire or the like, is disclosed. The cutting tool is provided with a relatively small number of first helical grooves in its body portion, and a relatively large number of second helical grooves. The first and second sets of grooves are oriented in opposite directions relative to the longitudinal axis of the cutting tool. The tool so constructed is durable and capable of providing quick and clean operation in forming an opening in the said object.

12 Claims, 1 Drawing Sheet

CUTTING TOOL

BACKGROUND AND SUMMARY

This invention relates to a cutting tool, and more particularly to a tool for use in reaming an opening in an object.

When recapping or retreading tires, it is desirable to ream an opening in the tire where there has been a puncture in the tire. The opening is reamed to a nominal diameter, and a rubber plug is placed in the reamed opening prior to the recapping or retreading process.

With modern tire construction emphasizing durability of the tire, various reinforcing and/or stablizing materials are incorporated into the tire in a multi-layer fashion. One such material incorporated into tires a steel belt. Reaming openings in steel belted tires is a difficult task and, to date, there has been no satisfactory reaming tools which provide a clean opening in the tire and which can stand a high number of repeated reaming operations in a steel belted tire.

It is an object of the present invention to provide a cutting tool for use in reaming an opening in an object, such as a steel belted tire, which provides an opening having clean sidewalls by shearing off the steel filaments in the steel belt at the opening.

It is a further object of the invention to provide a cutting tool which is capable of withstanding a high number of repeated reaming operations.

It is further an object of the invention to provide a cutting tool which quickly, cleanly and easily cuts through an object, such as a steel belted tire, when mounted to a rotating tool, so as to relieve operator stress and injury.

In accordance with the invention, a tool for use with a rotating device for forming an opening in an object comprises an axial body portion and an end portion. The end portion is adapted to be received within the rotating device so that, upon rotation thereof, rotation is imparted to the tool. The body portion includes a plurality of helical endmill flutes extending from an end of the body portion and oriented at a first angular relationship to the axis of the body portion. A plurality of helical burr flutes are formed at the outer tips of the endmill flutes, and are oriented at an angular relationship relative to the axis of the body portion opposite that of the endmill flutes. The body portion is preferably provided with a sharpened tip opposite the end portion, for easy entry of the tool into the object. The sharpened tip preferably has a plurality of helical flutes formed therein. Each of the flutes in the sharpened tip preferably provides a substantially radially oriented cutting surface which bites into the object during rotation of the tool. In a preferred embodiment, the body portion defines a first diameter upon rotation of the tool, and a neck portion is preferably disposed between the body portion and the end portion, with the neck portion having a reduced diameter relative to that of the body portion. The endmill flutes provide a relatively small number of deep helical grooves about the body portion. The burr flutes provide a relatively large number of shallow grooves extending about the body portion in a helical direction opposite that of the endmill flutes.

The invention also contemplates a method of making a cutting tool, substantially in accordance with the foregoing description. Also contemplated is a method of forming an opening in an object, also in accordance with the foregoing.

BRIEF DESCRIPTION OF THE DRAWINGS

The drawings illustrate the best mode presently contemplated of carrying out the invention.

In the drawings:

FIG. 1 is an elevation view of a prior art single burr flute cutting tool;

DETAILED DESCRIPTION OF THE PRIOR ART

With reference to FIG. 1, a prior art tool for reaming an opening in an object comprises a shank 10 adapted for placement in the collet of a rotating device, a burred intermediate portion 12, and sharpened tip 14. Shank 10 is provided with a series of flats, one of which is shown at 16, which cooperate with the collet of the rotating device to secure the tool therein.

Figure 2:
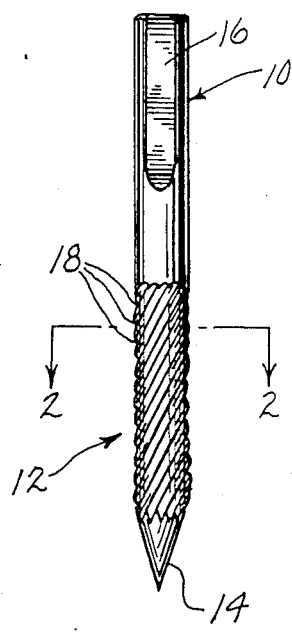
FIG. 2 is a sectional view taken generally along 2—2 of FIG. 1.

Intermediate portion 12 is provided with a series of equally spaced helical grooves, shown at 18, about its outer periphery. Grooves 18 are each formed by a cutting face, such as shown 20, and a leading surface, such as shown at 22. The inner ends of adjacent cutting faces 20 and leading surfaces 22 form the valley of each groove 18. The outer points of adjacent cutting faces 20 and leading surfaces 22 form a sharp point therebetween. As shown, each cutting face 20 is provided with a positive rake angle of between 0 degrees and 10 degrees. With reference to FIG. 2, rotation is imparted to the tool in a clockwise direction, wherein the cutting surfaces 20 bite into the object in which the opening is formed.

The structure illustrated in FIGS. 1 and 2 has been found to provide satisfactory operation, but is incapable of performing repeated operations in forming openings in objects such as steel belted tires or the like.

One solution has been to provide a double burr flute to intermediate portion 12, wherein a series of grooves similar to grooves 18 are formed in intermediate portion 12, but oriented at an angle relative to the longitudinal axis of the tool opposite that of grooves 18. The same problems of rapid wear have been found to exist with this type of structure as well.

DETAILED DESCRIPTION OF THE PREFERRED EMBODIMENT

Figure 3:
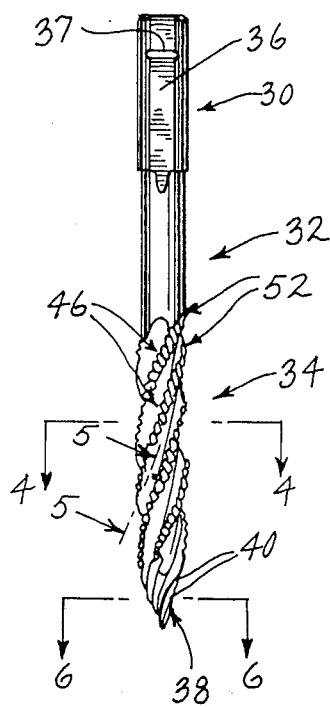
FIG. 3 is a view similar to FIG. 1, illustrating a cutting tool constructed according to the present invention.

With reference to FIG. 3, an improved tool for forming an opening in an object such as a steel belted tire or the like includes an end portion 30, an intermediate portion 32, and a work-performing body portion 34. End portion 30 is formed similarly to shank portion 10 in the prior art tool shown in FIG. 1, in that a series of flats, such as shown at 36, are formed equally spaced about the periphery of end portion 30. Again, the flats are adapted to be accepted within the collet of a rotating device, for imparting rotation to the tool. A notch 37 is formed in one of the flats 36, which receives a set screw provided on the rotating device. This prevents the tool from being pulled out of the collet, such as when the tool is being withdrawn from the object.

The tool shown in FIG. 3 is constructed from a blank made of standard C-2 grade solid carbide material.

Figure 6:
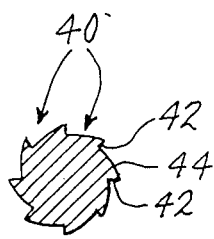
FIG. 6 is a sectional view taken generally along line 6—6 of FIG. 3.

Body portion 34 is formed so as to provide a sharpened tip 38 at the end opposite end portion 30. As shown in FIG. 3, sharpened tip 38 defines an angle of about 35°. Tip 38 is provided with a series of equally spaced helical grooves, such as shown at 40 (FIGS. 3, 6). Referring to FIG. 6, each groove 40 is formed by a cutting face 42 and a leading surface 44. As shown, cutting faces 42 are oriented at a positive radial rake angle relative to a radius of tip 38, and leading surfaces 44 provide a convex, outwardly curved surface between adjacent cutting surface 42. Each leading surface 44 terminates at its outermost extent in a point formed between the leading surface and the cutting face 42 to which it is adjacent. At its innermost point, each leading surface 44 terminates adjacent the inner end of a cutting face 42, forming the valley each groove 40. With the construction of tip 38 as described, upon imparting of rotation to the tool and simultaneous application of an axial force thereon, entry of the tool into the object in which the opening is being formed is substantially eased as compared to the structure shown in FIGS. 1 and 2.

Figure 4:
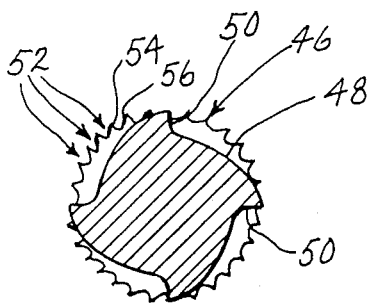
FIG. 4 is a sectional view taken generally along line 4—4 of FIG. 3.

Referring again to FIG. 3, work-performing body portion 34 is provided with a relatively small number of deep helical grooves 46 extending about its periphery. Grooves 46 provide an endmill burr to body portion 34. In the embodiment of the invention as illustrated in FIG. 3, there are four equally spaced grooves 46 formed in body portion 34 between intermediate portion 32 and sharpened tip 38. It is contemplated that any relatively small number of equally spaced grooves 46 will provide satisfactory operation; illustratively, between four and eight equally spaced grooves 46 may be employed. As shown in FIGS. 3, 4 and 6, sharpened tip 38 is provided with two helical grooves for each deep helical groove 46 formed in body portion 34.

Referring to FIG. 4, each groove 46 is formed by a leading surface 48 and a cutting surface 50. Referring to FIG. 4, rotation is imparted to the tool in a clockwise direction, so that each cutting surface 50 bites into the material of the object during rotation of the tool and insertion of the object for forming an opening therein.

The innermost points of leading surfaces 48 and cutting surfaces 50 terminate adjacent each other at the valley of groove 46. The outer end of each leading surface 48 terminates at the outer end of the adjacent cutting surface 50 so as to provide an outer tip formed between adjacent leading surfaces 48 and cutting surfaces 50.

As shown, each leading surface 48 provides an outwardly convex curvature, providing a gradual entrance into the valley of each groove 46 during rotation of the tool. Each cutting face 50 is formed with a positive radial rake of approximately 12 degrees. It is contemplated that a range for the rake of cutting surface 50 between 9 degrees and 15 degrees will provide satisfactory operation.

As shown, grooves 46 are relatively deep, with the valley of each groove providing a passage for conveying cut material from the opening in the object as it is being formed during rotation of the tool.

A large number of shallow helical grooves, shown generally at 52, are formed adjacent the outer end of each leading surface 48 of deep grooves 46, and are oriented in a second angular relationship relative to the axis of the tool opposite that of the angular relationship of deep grooves 46. That is, as shown, deep grooves 46 provide a left hand spiral about body portion 34, grooves 52 provide a right hand spiral. This structure is adapted for right hand cutting. Conversely, for left hand cutting, a right hand spiral is provided to grooves 46, and a left hand spiral provided to grooves 52.

There is a relatively large number of grooves 52 formed about the periphery of body portion 34. Illustravely, thirty-two (32) grooves 52 are formed on the outer tip of each leading surface 48 opening onto the adjacent cutting surface 50, between the upper most point of body portion 34 and the lower most point of body portion 34 adjacent tip 38.

Grooves 52 may satisfactorily be provided with a radial rake of 0 degrees, but a radial rake of positive 5 degrees or negative 5 degrees have been found to provide a satisfactory operation. As shown in FIG. 4, grooves 52 are provided with a radial rake of approximately positive 5 degrees. Somewhat similarly to deep grooves 46, shallow grooves 52 are each formed by a leading surface 54 and a cutting surface 56, with adjacent leading surfaces and cutting surfaces forming sharpened outer tips therebetween.

Figure 5:
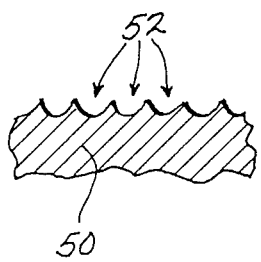
FIG. 5 is a partial elevational view showing the burr flutes as formed on the outer tips of the endmill flutes, reference being made to line 5—5 of FIG. 3.
Figure 2:
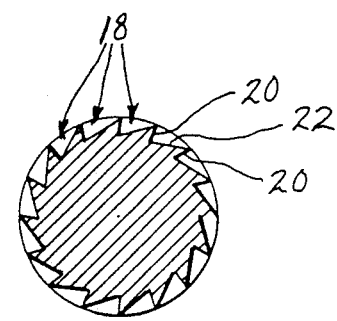

FIG. 5 illustrates a series of grooves 52, showing that each groove 52 opens onto the cutting surface 50.

It is has been found that the above-described structure provides a cutting tool which performs extremely satisfactorily in forming an opening in an object such as steel belted tire or the like. As noted previously, grooves 40 in sharpened tip 38 act to ease entry of the tool into the object. Deep grooves 46, by the action of cutting surfaces 50, provide quick and sure cutting of the material as the tool is rotated and pushed into the object. The valley of each groove 46 provides a passage by which the cut material is conveyed upwardly and out of the object during the cutting operation. The shallow grooves 52, due to their orientation oppositely of deep grooves 46, provide a shearing action which acts to sever the steel fibers in the steel belt as body portion 34 of the tool is pushed therethrough, thereby providing clean walls to the opening formed in the object. With previous cutting tools, it was often the case that the steel fibers were not severed cleanly, but instead were bent around the wall of the opening formed in the object. The tool is capable of repeated uses in forming openings in the object, thereby reducing the time which the operator must spend in changing tools. Additionally, the tool as described provides quick operation in forming the opening. It has also been found that the described tool operates at a lower temperature than previously known tools, thereby preventing the tool from melting the material, such as rubber, as the opening is being formed.

With reference to FIG. 3, intermediate portion 32 forms a neck having a diameter narrower than the diameter formed by body portion 34 upon rotation thereof. This reduction in area of intermediate portion 32 provides ease in withdrawing the tool from the object after the opening is formed therein, and also allows the tool to be plunged deeply into the thick rubber without the tool binding in the opening.

Various alternatives and embodiments are contemplated as being within the scope of the following claims particularly pointing out and distinctly claiming the subject matter regarded as the invention.

I claim:

1. A tool for use with a rotating device for forming an opening in an object, comprising:

an axial body portion having a relatively small number of first deep helical grooves formed therein with adjacent grooves defining an outer tip therebetween, said first grooves being oriented at a first angular relationship to the axis of said body portion, said body portion further having a relatively large number of second shallow grooves formed therein, said second grooves being formed in the outer tips disposed between adjacent first grooves and being oriented at a second angular relationship relative to the axis of said body portion opposite that of said first grooves, said second grooves defining pointed outer tips at the outer periphery of said tool; and an end portion adapted for connection to said rotating device for imparting rotation to said body portion.

2. The tool of claim 1, wherein said body portion defines a first diameter upon rotation thereof, and further comprising a neck portion disposed between said body portion and said end portion, said neck portion having a reduced diameter relative to that of said body portion.

3. The tool of claim 1, further comprising a sharpened tip extending from said body portion opposite said end portion.

4. The tool of claim 3, wherein said sharpened tip is provided with a plurality of helical flutes for easing entry of said device into said object.

5. The device of claim 1, wherein each of said first grooves is defined by a leading surface and a cutting surface, said leading surface providing a convex curvature between an inner point adjacent the valley of said groove and an outer point forming said outer tip, and said cutting surface providing a substantially radially oriented face disposed between an inner point adjacent the valley of said groove and an outer point forming said outer tip.

6. The device of claim 1, wherein, the pointed outer tips defined by said second grooves each include a cutting face oriented at a positive rake angle relative to a radius of said body portion.

7. A method of making a tool for use with a rotating device for forming an opening in an object, comprising the steps of:

providing an axial body portion;
providing an end portion connected to said body portion and connectable to said rotating device;
forming in said body portion a relatively small number of first deep helical grooves, with adjacent grooves defining an outer tip therebetween, said first grooves being formed so as to be oriented in a first angular relationship to the axis of said body portion; and
forming in the outer tips between adjacent first grooves a relatively large number of second, shallow helical grooves, said second grooves being formed so as to be oriented in a second angular relationship relative to the axis of said body portion opposite that of said first grooves, said second grooves being formed so as to provide pointed outer tips at the outer periphery of said tool.

8. A tool for use with a rotating device for forming an opening in an object, comprising:

an axial body portion having a relatively small number of first deep helical grooves formed therein with adjacent grooves defining an outer tip therebetween, said first grooves being oriented at a first angular relationship to the axis of said body portion, said body portion further having a relatively large number of second shallow grooves formed therein, said second grooves being formed in the outer tips disposed between adjacent first grooves and being oriented at a second angular relationship relative to the axis of said body portion opposite that of said first grooves;

an end portion adapted for connection to said rotating device for imparting rotation to said body portion; and a sharpened tip extending from said body portion opposite said end portion, said sharpened tip defining an included angle of about 35° and being provided with a plurality of helical flutes, for easing entry of said tool into said object.

9. The tool of claim 8, wherein said sharpened tip is provided with approximately two (2) helical flutes for each relatively deep groove formed in said body portion.

10. A tool for use with a rotating device for forming an opening in an object, comprising:

an axial body portion having a relatively small number of first deep helical grooves formed therein with adjacent grooves defining an outer tip therebetween, said first grooves being oriented at a first angular relationship to the axis of said body portion, said body portion further having a relatively large number of second shallow grooves formed therein, said second grooves being formed in the outer tips disposed between adjacent first grooves and being oriented at a second angular relationship relative to the axis of said body portion opposite that of said first grooves, said second grooves defining pointed outer tips at the outer periphery of said tool;

an end portion adapted for connection to said rotating device for imparting rotation to said body portion; and a sharpened tip extending from said body portion opposite said end portion, said sharpened tip defining an included angle of about 355° and being provided with a plurality of helical flutes, for easing entry of said tool into said object.

11. A method of making a tool for use with a rotating device for forming an opening in an object, comprising the steps of:

providing an axial body portion;
providing an end portion connected to said body portion and connectable to said rotating device;
forming in said body portion a relatively small number of first deep helical grooves, with adjacent grooves defining an outer tip therebetween, said first grooves being formed so as to be oriented in a first angular relationship to the axis of said body portion;
forming in the outer tips between adjacent first grooves a relatively large number of second, shallow helical grooves, said second grooves being formed so as to be oriented in a second angular relationship relative to the axis of said body portion opposite that of said first grooves;

providing a sharpened tip extending from said body portion opposite said end portion, said sharpened tip defining an included angle of about 35°; and forming in said sharpened tip a plurality of helical flutes, for easing entry of said tool into said object.

12. A method of making a tool for use with a rotating device for forming an opening in an object, comprising the steps of:

providing an axial body portion;

providing an end portion connected to said body portion and connectable to said rotating device;

forming in said body portion a relatively small number of first deep helical grooves, with adjacent grooves defining an outer tip therebetween, said first grooves being formed so as to be oriented in a first angular relationship to the axis of said body portion;

forming in the outer tips between adjacent first grooves a relatively large number of second, shallow helical grooves, said second grooves being formed so as to be oriented in a second angular relationship relative to the axis of said body portion opposite that of said first grooves, said second grooves being formed so as to provide pointed outer tips at the outer periphery of said tool;

providing a sharpened tip extending from said body portion opposite said end portion, said sharpened tip defining an included angle of about 35°; and forming in said sharpened tip a plurality of helical flutes, for easing entry of said tool into said object.

* * * * *

UNITED STATES PATENT AND TRADEMARK OFFICE
CERTIFICATE OF CORRECTION

PATENT NO. : 4,957,397

DATED : September 18, 1990

INVENTOR(S) : Mark James Huff

It is certified that error appears in the above-identified patent and that said Letters Patent is hereby corrected as shown below:

Column 6, Line 47
Claim 10, Line 22:

After "about", delete "355°" and substitute therefore -- 35° --.

Signed and Sealed this

Seventeenth Day of March, 1992

Attest:

HARRY F. MANBECK, JR.

*Attesting Officer*    *Commissioner of Patents and Trademarks*